No. 756,371. PATENTED APR. 5, 1904.
W. C. JAMES.
APARTMENT HOUSE.
APPLICATION FILED MAR. 16, 1903.
NO MODEL. 5 SHEETS—SHEET 1.
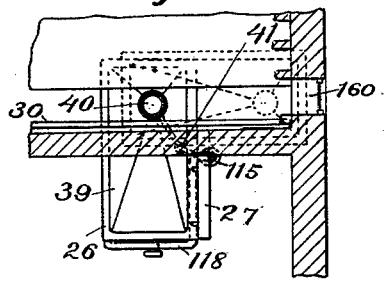
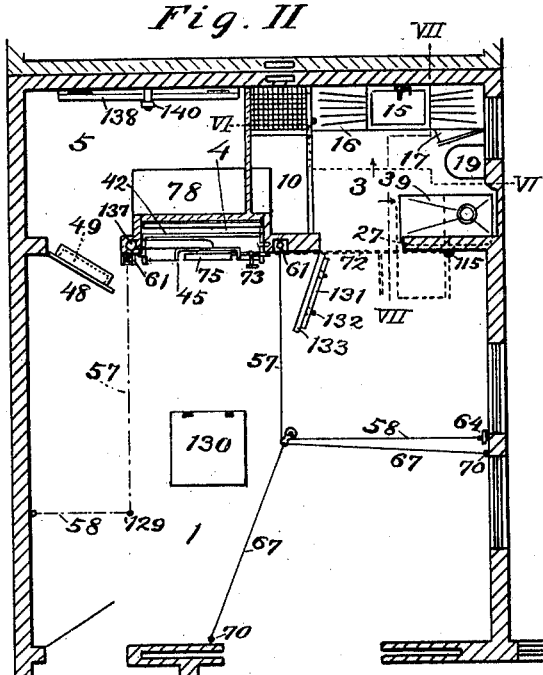
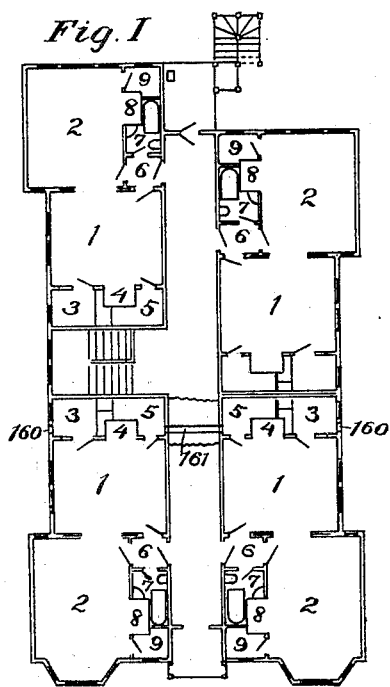
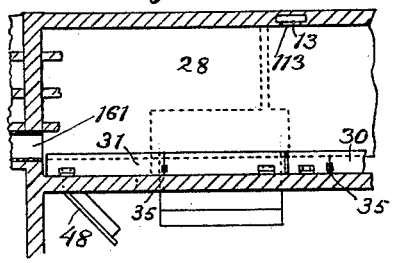
Witnesses:
C. C. Holly.
A. P. Knight
Inventor:
Willard C. James
by Townsend Bros.
His Attys.

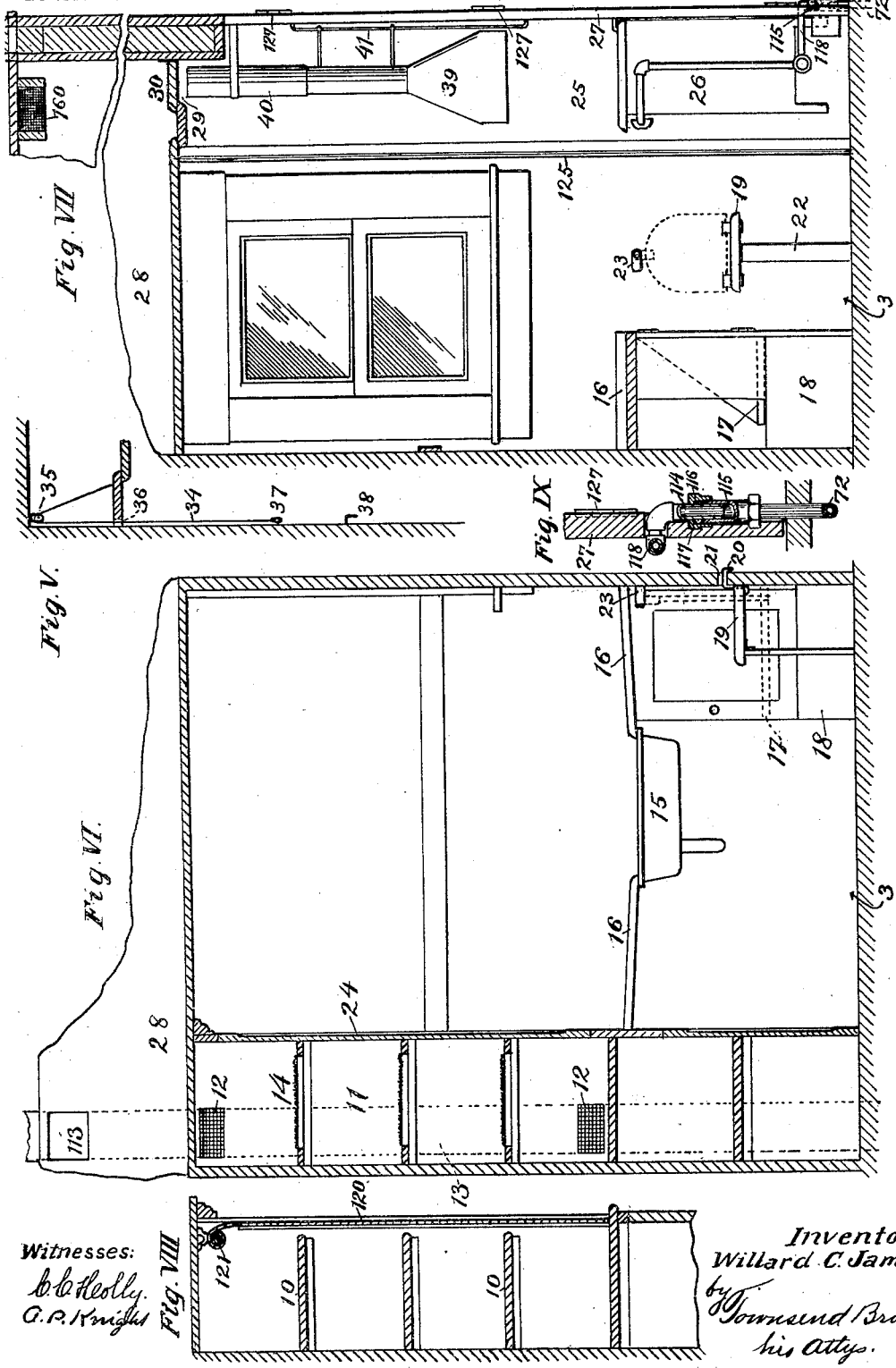

No. 756,371. PATENTED APR. 5, 1904.
W. C. JAMES.
APARTMENT HOUSE.
APPLICATION FILED MAR. 16, 1903.
NO MODEL. 5 SHEETS—SHEET 3.
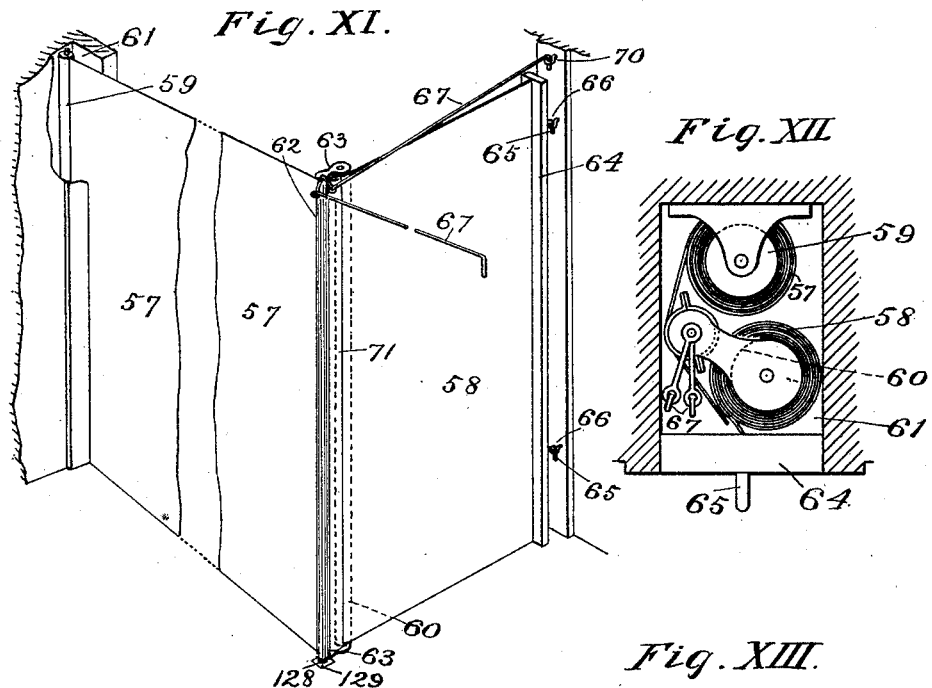
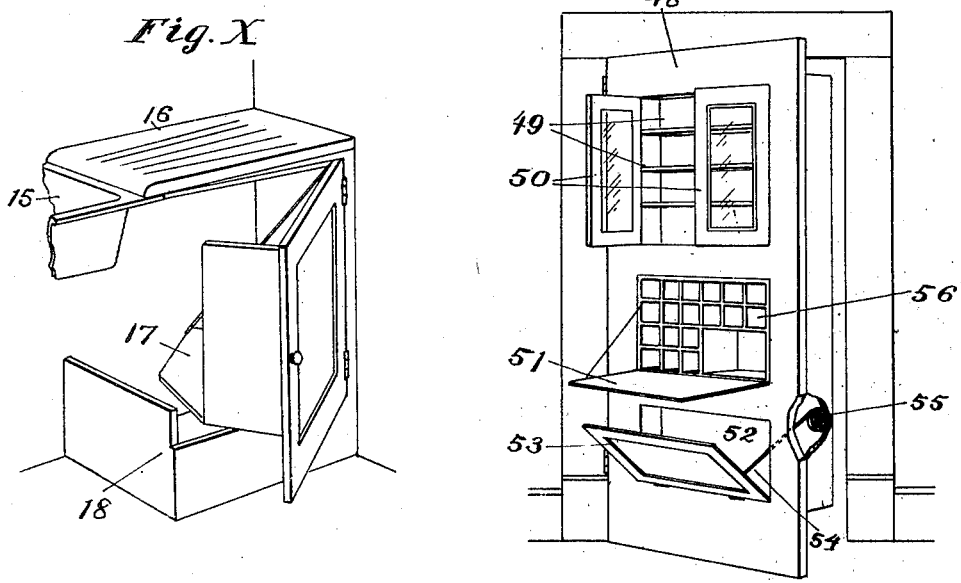
Witnesses:
C. C. Heolly
O. P. Knight.
Inventor:
Willard C. James:
by Townsend Bros
His Attys.

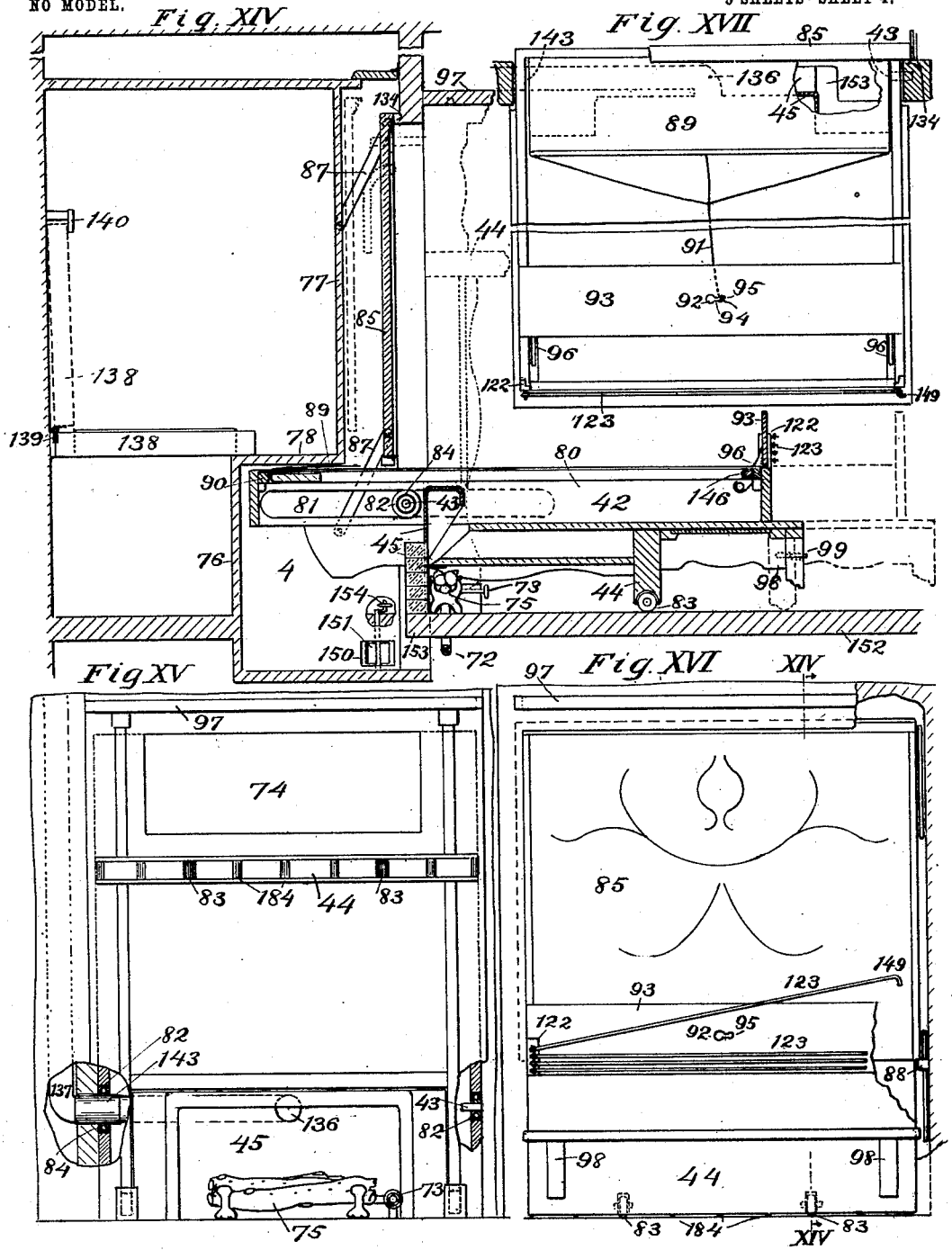

No. 756,371. PATENTED APR. 5, 1904.
W. C. JAMES.
APARTMENT HOUSE.
APPLICATION FILED MAR. 16, 1903.
NO MODEL. 5 SHEETS—SHEET 5.
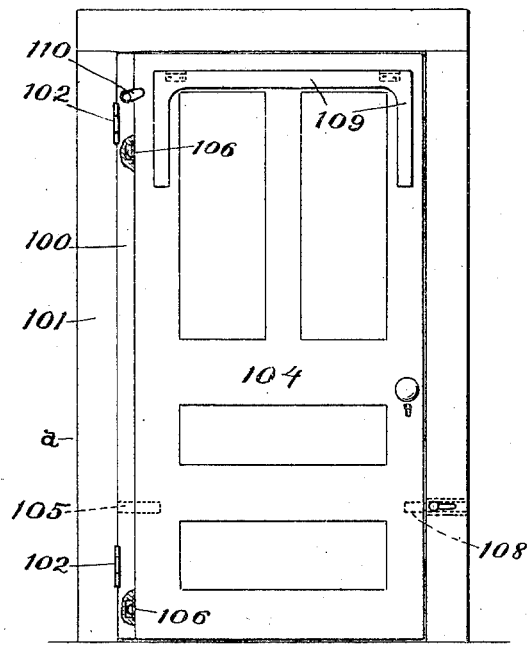
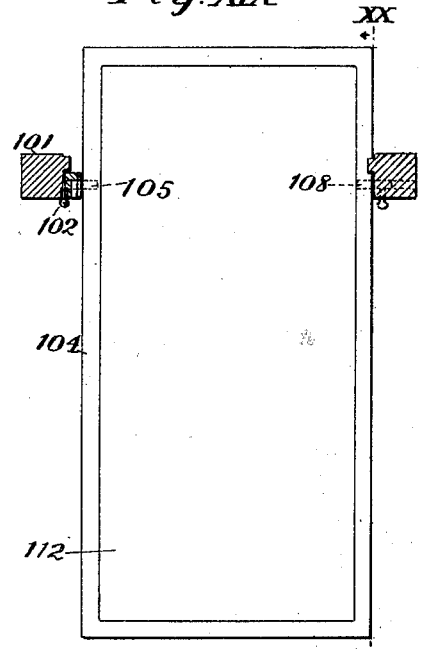
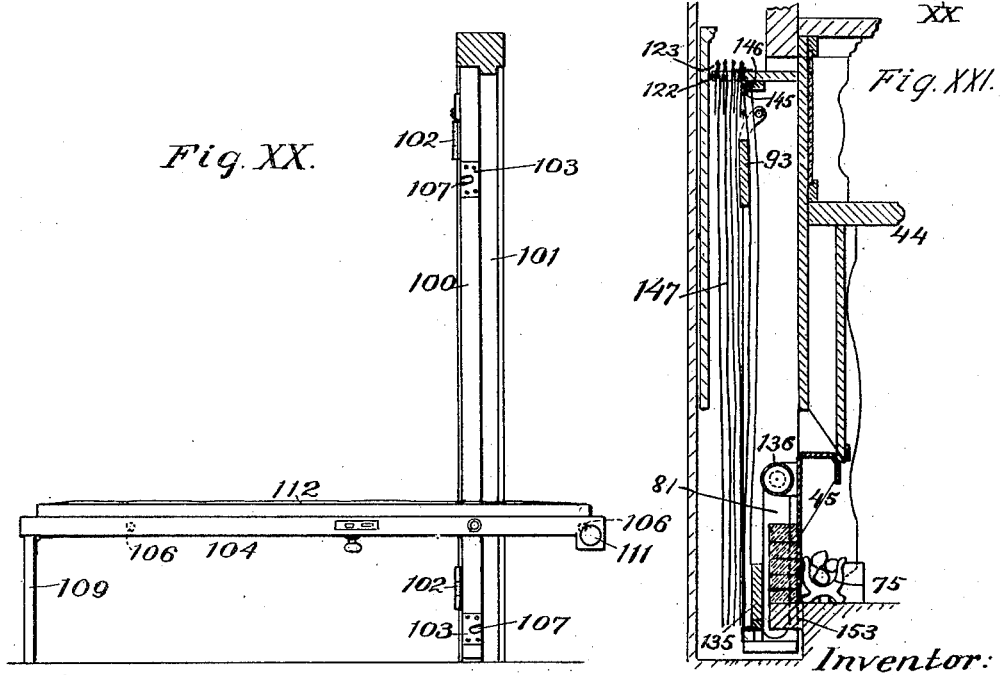
Witnesses:
C. C. Holly
O. P. Knight
Inventor:
Willard C. James
by Townsend Bros
His Attys No. 756,371.

Patented April 5, 1904.

UNITED STATES PATENT OFFICE.

WILLARD C. JAMES, OF CUCAMONGA, CALIFORNIA.

APARTMENT-HOUSE.

SPECIFICATION forming part of Letters Patent No. 756,371, dated April 5, 1904.

Application filed March 16, 1903. Serial No. 147,932. (No model.)

*To all whom it may concern:*

Be it known that I, WILLARD C. JAMES, a citizen of the United States, residing at Cucamonga, in the county of San Bernardino and State of California, have invented new and useful Improvements in Apartment-Houses, of which the following is a specification.

This invention relates to features of house construction and arrangement that are especially applicable in connection with apartment-houses, although many of said features may with advantage find application in houses or apartments generally.

The main object of the invention is to provide in an apartment or flat having a small number of rooms all the conveniences and utilities generally found in a larger flat or house, with the result that the housekeeper while having only the labor of attending to, say, a couple of rooms, has the use of a plurality of bed-rooms, a plurality of living or reception rooms, a kitchen, and a bath-room. To this end kitchen, closet, and folding-bed compartments may be arranged to occupy a side of one of the rooms, and bath-room, hall folding bed, and closet-compartments a side of the other room, the several compartments fitting in with one another to economize space as much as possible. I also provide for setting off a part of one or more of the apartments, if desired, either by itself or as an extension of an adjacent compartment. Thus the kitchen may be temporarily enlarged at the expense of the dining-room or back parlor, or an extra bed-compartment may be set off from either living-room or bed-room to provide for visitors. It is generally desirable to extend the partition used for this purpose only part way across the room, so as to save space and allow access to a window or door on the side of the room, and to effect this I provide means for forming a curtain-partition with a plurality of sides angularly arranged to form two or more sides of the set-off compartment.

An important object of my invention is the simplification or economizing of plumbing connections as far as possible. In combination apartments of this character the expenses due to ground area occupied and material used are reduced to a minimum in comparison with the capacity of the house; but the plumbing expense is reduced but little and is therefore relatively high. It is therefore of the greatest importance to so arrange the compartments that a minimum of piping connections is required. To this end I arrange the compartments in each suite that require such connections in juxtaposition or proximity to similar compartments in adjacent suites. To give a maximum economy of space, the bed-compartment is also made to serve as a heater-compartment for heating the room, if desired, when the bed is not in use, and my invention provides for locating this heating-compartment in each room next to a compartment requiring plumbing.

Further objects of my invention are the provision of special space-economizing devices in the kitchen-compartment and ventilating devices for the respective compartments.

A further object of my invention is to provide improved folding-bed devices in connection with certain compartments of the room and with parts connected therewith—namely, the fireplaces or mantels of certain compartments and the door of one or more compartments—so as to enable the combined use or adaptation of the room, as above stated, and my invention also relates to the special construction of such folding-bed devices.

Another object of my invention is to provide improved retaining and ventilating means for the bedding in the bed-compartments.

The accompanying drawings illustrate my invention.

Figure I is a plan of one floor of an apartment-house embodying my invention. Fig. II is a plan of a single suite of rooms or double compartment. Figs. III and IV are detailed plans showing the ventilating devices in the several compartments. Fig. V is a detail vertical section of one of such ventilation devices. Fig. VI is a vertical section on the line VI VI of Fig. II. Fig. VII is a vertical section at right angles to Fig. VI on the line VII VII in Fig. II. Fig. VIII is a vertical section of shelves in the kitchen and a closure therefor. Fig. IX is an axial section of the swivel-coupling of the gas-stove connection. Fig. X is a perspective view of a swinging shelf in the kitchen. Fig. XI is a perspective view of the partition device. Fig. XII is a horizontal section showing the partition device in closed position. Fig. XIII is a perspective view of a combined door and swinging closet used in connection with one of the rooms. Fig. XIV is a vertical section on the line XIV XIV in Fig. XVI of a folding bed and fireplace forming a part of my invention. Fig. XV is a front elevation of the combined folding bed and fireplace in closed position. Fig. XVI is a front elevation showing the bed-frame in lowered position. Fig. XVII is a broken plan view of the bed in lowered position. Fig. XVIII is an elevation of a combined door and bed forming part of my invention. Fig. XIX is a plan of the same, showing the door or bed frame in lowered position. Fig. XX is a vertical section on the line XX XX in Fig. XIX. Fig. XXI is a vertical section showing the folding bed and fire-place in raised position and with the bed-clothing on the ventilating-rack.

Referring to Figs. I and II, my invention is shown as applied to an apartment-house having on a single floor four suites of two rooms each. Each suite or double apartment comprises two rooms 1 2, each of which may be used as a living-room or parlor and as a bed-room, one of the rooms, as 1, being also adaptable for use as a dining-room. Along one side of room 1 are provided compartments 3 4 5, constituting, respectively, a kitchen-compartment, a bed-compartment, and a combined bed and closet compartment. Along one side of the other room, 2, are arranged compartments 6 7 8 9, forming, respectively, a hall, bath-room, a bed-compartment, and a bed and closet compartment. Each suite is desirably straight-sided and the parts or compartments in each suite that require plumbing are arranged adjacent to similar parts of the adjacent suites to minimize the amount of pipe connections required. Thus the kitchen-compartments of adjacent suites are shown as arranged in juxtaposition on one side of the floor, while on the other side they are separated only by a stairway. Similarly the bath-rooms of each suite are arranged so that only the central corridor or hall intervenes, and this hall may in some cases be omitted at this point. Doors are provided giving communication between the rooms and to the several compartments, closets, and halls. The kitchen-compartment 3 is provided on the side (see Figs. II and VI) next the bed-compartment 4 with shelves or closets 10 and a cooler or ventilated closet 11, which latter has an imperforate door 24 and has openings 12, leading from its lower and upper parts to a flue 13, that passes up in the adjacent wall and opens into the open air or into the open space below the roof. In this cooler are arranged wire-netting or similar perforate shelves 14 to support articles of food, &c., while permitting free upward draft of air. Along the rear side of compartment 3 is arranged a sink 15, with inclined trays or shelves 16 for receiving dishes, and under one of these trays is a swinging receptacle or shelf 17, that is adapted to receive the garbage-pail. This shelf is closed or boxed in front, so as to conceal the garbage-pail; but on swinging it forward the pail is accessible and is brought under the front edge of the tray 16, so that any waste or leavings on said shelf may be scraped into the pail. Beneath the swinging shelf 17 is an open-topped box-space 18, (see Fig. XII,) which is closed by the shelf when the latter is turned back and which may be used for storing vegetables, &c. On a third side, Fig. VII, of the kitchen-compartment is desirably provided a seat 19, that engages by its hooks 20 in slots 21 in the wall of the kitchen and has a hinged leg 22, adapted to rest on the floor to support the outer edge of the seat or to be folded against the bottom of the seat when the latter is turned up against the wall, as indicated in dotted lines. A turn-button 23 may be provided to hold the seat in raised or closed position. For a portion of its width the kitchen-compartment is cut away to form a vertical recess 25, providing additional room for the gas-stove 26, which latter is hung on the swinging support or hinged subleaf 27, forming a part of the door of the kitchen. This recess is desirably lined with sheet metal 125 to withstand the heat of the stove. When the support or subleaf 27 is in closed position, so as to bring the stove wholly within the kitchen-compartment, the said stove projects into the recess 25, and thus takes up less of the space of the kitchen-compartment, while at the same time said recess forms a flue or chimney to aid in directing the heated air from the stove up to the ventilator in the top of the compartment. When the hinged door-leaf 27 is thrown open, the stove is thereby brought out into the living-room. A swivel-coupling in the gas connection to the stove 26 is provided to permit of this swinging movement. This swivel-coupling is desirably formed as a tubular hinge axially in line with the hinges 127 and the subleaf 27. The construction of this tubular hinge is shown in Fig. IX, the same consisting of concentric tubular members 114, 115, with an outer screw-ring 117, screwing on the member 114 and compressing a packing 116 against the other member 115 to maintain a tight joint. The tubular member 115 communicates with the gas-stove by a pipe 118, and the member 114 communicates with the service or supply pipe 72. The kitchen-compartment has desirably a ceiling somewhat lower than the general ceiling of the suite to afford a fairly large air-space 28, into which the hot air from the kitchen may rise through an opening 29, controlled by a ventilator or valve 30. A similar low ceiling is desirably provided over the bed-recess 4 and the combined bed and closet recess 5, and a single ventilator 31 may be provided to close the openings from compartments 4 and 5 to the airspace above. This open air-space common to all the compartments is much more effective as a means for receiving and carrying off heated or foul air than separate small flues could be. Said open space desirably opens into the outer air, as hereinafter described, or it may open into the flue 13 by an opening 113. The ventilators 30 31 are desirably formed as hinged flaps or leaves swinging on horizontal pivots and operated by cords or flexible connections 34, (see Fig. V,) attached thereto and passing up over pulleys 35 and then down through notches or slots 36 in the ventilators to within convenient reach of a person in the compartment below. A ring or hook 37 on the lower end of the cord may engage a fixed nail or hook 38 to hold the ventilator open. To direct the fumes and vapor from the stove into the ventilator-openings 29, I may provide a hood 39, connected to the swinging door or support 27 and leading upwardly into a flue 40, also connected to said door and terminating at its upper end in proximity to said opening. The hood 39 is preferably slidable vertically on a rod 41, so that it may be raised to allow access to articles on the stove or may be lowered to cover them, maintaining in either case its communication with the flue 40. When the door-leaf 27 is swung outwardly to bring the stove out into the diningroom or living-room 1, the hood 39 and flue 40 may swing with it; but the upper end of the flue moves in a path beneath the ventilating-opening, so as to maintain its discharging relation to same. Shelves 10 on one side of the kitchen, Figs. II and VIII, are desirably provided with a roll-front closure or curtain 120, supported on a spring-roller 121 and adapted to be held in any desired position by any suitable means—for example, detent means such as are genererally in use with spring-rollers. One of the doors closing the closet-compartments—for example, the door 48, closing the closet 5—may have shelves, drawers, or recesses 49, enabling the door when closed to serve as a bookcase or receptacle for small articles of any kind, swinging panels 50 serving to close such recesses. A folding or hinged panel 51 on the front of this door may serve as a desk when turned down and as a closure for pigeonholes 56 when turned up, and a recess 52 may be provided on the lower part of said door, closed by a vertically-swinging panel 53. A spring device 55, connected to said swinging panel by a flexible connection 54, operates to close said panel automatically when the latter is released. All of the panels 50 51 53 are desirably formed to take the place as regards location and appearance of the usual fixed panels of the door.

As a means of setting off a part of one of the living-rooms to form a separate compartment for use as a temporary bedroom or extension of the kitchen I provide a partition device comprising a plurality of curtains 57 58, arranged to be supported at an angle to one another so as to inclose the set-off space on a plurality of sides. Such curtains are desirably supported on spring-rollers 59 60, similar to shade-rollers now in use. The partition device when not in use is desirably concealed in a vertical recess 61 in the wall-casing of the room, the spring-roller 59 being pivotally supported in said recess. Curtain 57 winds on the roller 59 and carries at its outer end a bar 62, provided with brackets 63, in which the roller 60 is pivoted. The curtain 58, winding on roller 60, has at its free end a bar, post, or strip 64, that is provided with downturned hooks or lugs 65, adapted to engage in eyes 66, fixed on a side wall or casing part of the room. Rods, struts, or links 67 are pivotally connected to the supplementary curtain-roller 60, being, for example, pivoted to the brackets 63, said rods being provided at their free ends with hooks adapted to engage eyes 70, fixed in suitable positions on the walls of the room. A pin 128 on the bottom of the rod 62 may engage in a hole or socket 129 in the floor to hold the lower end of said bar in position. A strip or flap 71 of curtain material is desirably provided on the bar 62 to conceal the open joint between said bar and the spring-roller 60 when the partition device is in use. The bar or strip 64 at the free end of the supplementary curtain is desirably formed to fit the opening of recess 61 in the wall-casing, so that when the partition device is drawn back by its springs into said recess, as shown in Fig. XI, said strip will act as a closure for said recess and apparently form a part of the wall. To use the partition device, the housekeeper grasps this strip, either by one of the hooks 65 or otherwise, and draws it out sufficiently to enable her to reach the main curtain 57, which she draws out and fastens in position in the room by engaging the pin 128 in the floor-socket 129 and the hooked rods 67 in the fixed eyes 70. Then the curtain 58 is drawn out to the side wall and its hooks 65 allowed to fall into eyes 66, thus closing the compartment. The supplementary curtain 58 may be used as a door to give access to this compartment.

In Fig. II a partition device 57 58 is shown in full lines drawn out to provide an extension for the kitchen, and another partition is shown in close position adjacent to the closed compartment 5, the dotted lines 57 58 indicating its position when drawn out to form an extension of such compartment suitable for use as a dressing-room, retiring-room, or an extra bed-room.

In the bed-room compartment 4 is provided a folding bed-frame 42, pivotally supported by trunnions 43 143 and adapted when turned down to form a bed and when turned up to close the recess 4 and form part of the wall of the room. This frame 42 is also desirably formed as a mantel and fireplace having a shelf 44 thereon, which serves as a mantelpiece when the frame is up and as a foot or leg to support the bed-frame when turned down. A recessed fireback or fireplace 45 may be supported in fixed position on a rearward extension 153 of the floor 152, so as to extend back of and over a heater or fire-log 75, which is fixed in position beneath the bed-frame and is connected, through a valve connection, whose operating-handle is indicated at 73, with the service-pipe 72. This service connection leads also to the kitchen-stove, and owing to the proximity of these heating devices a minimum of piping will be required. The location of the fire-log or heater in fixed position beneath the bed-frame and the provision of the fixed fireplace 45, which when the bed is down extends up into the same, as shown in Fig. XIV, and when the bed is raised is exposed to serve as a fireplace, as shown in Figs. XV and XXI, is a distinct and novel feature of my invention, which conduces to the general end herein sought— namely, the reduction of the space and of the piping connections required to a minimum. When the bed is lowered, the rear ends of its side boards 80 swing forward on either side of the rearward floor projection 153. The folding bed-frame 42 is desirably constructed, as shown in Figs. XIV to XVI, so that it can be slid out when it is turned down to bring the rear end nearly to the front of the bed-compartment. With this construction the lower part 76 of the partition between the bed-compartment 4 and the closet and bed compartment 5 may be made as an offset receptacle extending far enough back to permit the rear end of the bed to swing up into it, and the upper part 77 of such partition may project forward, the bed being drawn out when lowered from the position shown in full lines to that shown in broken lines in Fig. XIV. The ledge or set-off 78 between these two parts of the partition serves as a seat or shelf, and the increased space afforded in the compartment 5 is clear gain, as such space would have been wasted in the back of the bed-compartment 4. To enable the bed to be slid forward, as stated, the side boards 80 of the bed-frame 42 have slots 81 engaging the trunnions 43 143, which latter may have ball-bearing rollers 84 to enable the bed-frame to move more easily. To further facilitate this movement, the front edge of the mantelpiece or supporting-board 44 may be provided with rollers 83, which are desirably countersunk within the mantelpiece. Beads or moldings 184 may also be formed on the edge of the mantelpiece simulating the appearance of these rollers and rendering the latter less conspicuous. 74 designates a mirror over the mantel 44. A headboard 85 is preferably provided in the compartment-space 4, and said headboard is desirably supported so as to move forward when the bed is lowered so as to advance nearly to the front of such compartment-space. Thus, as shown in Figs. XIV and XVI, parallel motion-bars or pivotal links 87 may be pivoted in the walls of compartment 4 and be pivotally connected to the movable headboard, so that when the bed is lowered these pivotal supports will allow the headboard to move by its own weight in a path which will carry it forward until it rests against fixed stop means, such as a stop 88, or, preferably, until it comes as a whole against the back of the framing or jamb 134 of the recess or compartment 4 of the bed, as shown in full lines in Fig. XIV. When the bed-frame is raised, its side boards strike the headboard and move it back to position shown in dotted lines in Fig. XIV. Bedding-retaining devices may be provided, as shown in Figs. XIV and XVII. A curtain-flap 89, of fabric, is attached to the head of the spring-bed 90, and its forward end is attached to a cord 91, whereby it may be pulled over the bedding, said cord being then fastened by slipping it through and along a slot 92 in the footboard 93 of the bed, so as to cause a knot or enlargement 95 thereon to pass back of the contracted portion 94 of said slot. When the knot is brought opposite to the wider end of said slot, it may be slipped through the slot to enable the retaining means to be disengaged from the bedding. The footboard 93 is also preferably pivoted by hinges 96, so as to be folded against the bedding, as shown in Fig. XVII, either by the tension of the cord 96 or by gravity. 97 designates a shelf above the recess 4, that serves as an entablature for the mantel as a whole, posts 98 in the bed-frame 42 engaging under this shelf and being locked thereto by a spring-catch 99. The bed-frame 42 is counterweighted by suitable means, (indicated at 135.) The compartment 4 extends below the floor of the apartment 1 to form a well, which receives the rear end of the bed when turned down. One of the trunnions, as 143, of the bed is made hollow, and a flue or conduit 136 from the fireplace-recess 45 connects through this tubular trunnion with a flue 137 in the wall of the apartment. An extra bed or cot 138 may be provided in the closet-compartment 5, being pivoted or hinged at 139 to the side of said compartment and adapted when turned down to rest on the ledge 78 aforesaid, the fixed ledge serving not only as a support for the bed or cot, but as a lateral extension thereof. The bed 138 may be held in raised position by a button 140. In addition to the saving of room effected by this sliding and folding bed construction, there is the further advantage that when the bed is down and pulled out its center of gravity is so far out from the pivotal axis that great effort would be required to raise it, and there is, therefore, a greater feeling of security on the part of the user that it will not accidentally tip up.

The folding-bed above described is desirably provided with means for airing or ventilating the bedclothes during the daytime. For this purpose wires, bars, or rods 123 are pivoted at one end of the footboard-posts 122 and detachably engaged by hook means 149 with the other footboard-post, so as to form rack devices on which the bedclothing may be secured by clothes-pins, so that when the bed is turned up the bedclothes will hang open for free airing, as shown in Fig. XXI. The posts 122 are rabbeted to receive the hinged footboard 93. In case this device is employed the folding footboard 93 and flap 89, above described, may be used only to hold the mattress and under quilts against the spring-bed. To further support the mattress, the latter may be suspended from the foot end of the bed by loop means 145 on the mattress engaging hook means 146 on the immovable part of the footboard. In using the rack devices each bar 123 is freed at its hook end and the bedclothes slipped over it and fastened, and the bar 123 is then hooked in place. A similar combined sliding and folding bed and fireplace 42 is desirably provided in the recess 8 of the parlor or living room 2, and in association with the bath-room it presents the same advantages as above set forth, the gas connection 72' to the heater 126 in the bath-room and to the fireplace being partly in common. Said bed-frame 42 is arranged to swing or fold in the recess or compartment 8, above referred to, said compartment 8 projecting into the bath-room space, so as to utilize what would otherwise be waste space in the bath-room compartment 7. Compartment 8 is desirably closed at top and has a ventilating-opening controlled by a ventilator 119, similar to ventilator 31. The ledge 78, formed by the offset in the partition between the bed-compartment and the bath-room, forms a convenient seat for a person using the bath-tub 142 and may also be used as a shelf. Either or both of the folding-bed compartments may be provided with additional ventilating means consisting of a flue or ventilating connection 150, leading from the interior to the lower part of said recess, this flue having a controlling-valve or damper 151, with operating means 154.

In connection with either of the closet-compartments—for example, the closet-compartment 9 alongside the bath-room—I may provide in the wall $a$, which divides between the apartment and compartment 2 and 9 a body 104, one side of which is formed as an extra bed and the other as a closure for the door of said closet-compartment and adapted to swing on vertical hinges as a door and to tilt on horizontal pivots to enable it to be used as a bed. The pivoting of such body in this manner may be variously accomplished; but a desirable construction is that shown in Figs. XVIII to XX, wherein 100 designates a strip hinged to the side or jamb 101 of the door by hinges 102 and connected to said body 104 by a horizontal pivot 105. Headed pins or bolts 106 on the edge of said body are adapted to engage slots 107 in strips 103 on the strip 100, these slots being concentric with the pivot 105 to allow movement of said body on such pivot and the heads of said pins engaging both of said slots to brace said body against lateral movement. In line with the pivot 105 is a pivotal bolt 108 in the opposite jamb of the door, and when this bolt 108 is shot out or protracted said body 104 may be turned down on the pivots 105 108 to a horizontal position. At the same time a leg or foot piece 109, hinged to the front of said body, maintains or assumes a vertical position, as shown in Fig. XX, so as to rest on the floor and support the outer end of said body, enabling it to serve as a bed. When said body is raised, this hinged leg or support swings on its hinges so as to fold against said body, as shown in Fig. XVIII, and when so raised said body may be held vertical and locked to the strips 100 by a turn-button or catch 110 on the strip 100. The bolt 108 may then be retracted, so as to release said body, and the latter may be used as an ordinary door. A counterweight 111 may be provided for the combined door and bed. 112 designates a bed or cot attached to the rear of said body.

$c$ designates in a general way the walls of the inclosure for the apartments, compartments, or rooms.

A stand or center-table 130 may be provided in one of the rooms—say room 1—and a removable top 131 may be attachable thereto and may be provided with means engaging hooks or projections on the door 132 of the kitchen-compartment, so as to be hung up out of the way when not in use. This feature is fully shown and claimed in my Patent No. 700,501, dated May 20, 1902, but is herein shown, as it aids in the complete changing over of the room from a living-room to a dining-room.

The open space 28, extending above the compartments 3 4 5, desirably communicates with the outer air on each side of the building, as indicated in Figs. I and II, by screened openings 160, and an opening or passage 161, connecting the open spaces 28 on each side of the house, is also formed between the joists over the hall, so that a clear passage is provided for a draft of air from side to side of the house through the space, whereby a maximum of ventilating effect is attained.

The various means for ventilation above described are of especial advantage in connection with the condensed or interchangable apartment system described, for the reason that each room being in continuous use provision for continuous ventilation without interfering with such use is essential. The arrangement set forth has special advantages when used in cold climates, as it reduces the size of the building, and therefore the amount of artificial heat required to warm it.

What I claim, and desire to secure by Letters Patent of the United States, is—

1. In an apartment-house, a suite or double apartment, one room of which has one side occupied by a plurality of compartments, comprising a bath-room, and a bed-compartment projecting into the bath-room, and the other room has one side occupied by a plurality of compartments comprising a kitchen-compartment, a closet-compartment, and a bed-compartment projecting into one of said compartments.

2. In an apartment-house, a suite or double apartment, one room of which has one side occupied by a plurality of compartments, comprising a bath-room compartment, a closet-compartment and a bed-compartment projecting into one of the other compartments, and the other room has one side occupied by a plurality of compartments, comprising a kitchen-compartment, a closet-compartment, and a bed-compartment projecting into one of said compartments.

3. An apartment-house, comprising a plurality of suites or double apartments, one room of each suite having one side occupied by a set of compartments, comprising a bath-room and a bed-compartment, and the other room of each suite having one side occupied by a set of compartments, comprising a kitchen-compartment and a bed-compartment, similar sets of compartments being arranged in proximity and back to back in adjacent suites.

4. In an apartment-house, a plurality of suites, having arranged in juxtaposition and back to back, similar sets of compartments, comprising a kitchen-compartment provided with a gas-stove, and a folding-bed compartment adjacent to the kitchen-compartment and provided with gas-heating means.

5. In an apartment-house, a plurality of suites having, arranged in proximity and back to back, similar sets of compartments, comprising a bath-compartment and a bed-compartment, both provided with heating means, and gas-supply connections common to both of the heating means.

6. In an apartment construction, a room having a compartment formed at the side thereof, with a closet at the back of said compartment having perforate shelves, the wall or room-casing back of said closet being provided with a flue connected to the lower and upper parts of said closet.

7. In an apartment construction, a room having a kitchen-compartment formed at one side thereof with a vertical recess formed in one side of the wall of said compartment, a swinging door, between said room and compartment, a gas-stove hung on said swinging door and projecting into said recess when the door is closed, and ventilating means above said recess.

8. In an apartment construction, the combination of the room-casing having a ventilating-opening in its top, a swinging gas-stove and a flue arranged to direct the hot air from said stove to said opening, while allowing the swinging movement of the stove.

9. In an apartment construction, the combination of the room-casing having a ventilating-opening in its top, a stove, a swinging support for said stove, and a flue connected to said swinging support and movable beneath the ventilating-opening so as to maintain its communication therewith.

10. In an apartment construction, the combination of a stove, a ventilating-flue, and a hood slidably connected to said flue and extending over the stove.

11. In an apartment construction, the combination of a stove, a swinging support therefor, a hood mounted to slide vertically on said support and extending over the stove, a flue communicating with said hood and attached to said support, and a room-casing having in its top an opening extending over the path of movement of the flue to receive the discharge therefrom in all positions of the flue.

12. In a kitchen-apartment construction, the combination of the sink, the inclined tray arranged to drain into the sink, and a swinging shelf arranged below said tray and adapted to swing forward under the edge thereof.

13. In a kitchen-apartment construction, the combination of the sink, the inclined tray arranged to drain into the sink, and a swinging shelf arranged below said tray and adapted to swing forward under the edge thereof, said shelf having a closed front serving as a screen when the shelf is closed.

14. In a kitchen-apartment construction, the combination of the swinging shelf having a closed front and an open-topped box beneath said shelf and closed by said shelf when the latter is closed.

15. A room provided with a lateral compartment of less height than the room, and with a ventilating-space above said compartment, an opening being provided from said compartment into said space, a ventilator over said opening, and means for controlling said ventilator.

16. A room or compartment having a ventilating-opening in its top, a hinged flap over said opening, a pulley over said flap, and a cord attached to the flap and passing up over said pulley and down through a slot in said flap.

17. In an apartment construction, the combination of a wall-casing having a recess, a vertical roller pivoted in said recess and having a curtain wound thereon, and a cover for said recess connected with said roller.

18. In an apartment construction, a room having a compartment at one side, a door for said compartment provided with a recess and with a vertically-swinging panel for closing said recess, and a spring device for operating said panel to close same.

19. The combination with the hinged support and the gas-stove carried thereby, of gas-pipe connections to said stove comprising a swivel-coupling formed as a tubular hinge in line with the hinge-axis of the said support.

20. The combination with the hinged support, and the gas-stove carried thereby, of the gas-pipe connections to the stove comprising a swivel-coupling formed of two concentric tubular members, a screw-collar engaging one of said members and a packing means pressed by said screw-collar against the other member.

21. In an apartment construction the combination with two adjoining apartments and a hinged door-leaf between said apartments, of a gas-stove carried by said hinged door-leaf, and gas connections to said stove comprising a tubular hinge in line with the axis of the door.

22. The combination with the wall-casing having a recess, of a folding and sliding bed-frame mounted to fold into said recess and to be capable of being turned down and drawn out from said recess.

23. The combination with the wall-casing having a recess, of a folding and sliding bed-frame, trunnions whereby said bed-frame is pivotally supported in said recess, and connections between said trunnions and bed-frame, whereby the latter may be drawn out when in lowered position.

24. The combination of the wall-casing having a recess, trunnions on said casing in said recess, and a bed-frame having slots engaging said trunnions.

25. The combination of the wall-casing having a recess, trunnions on said casing in said recess, a bed-frame having slots, and rollers engaging said slots and journaled on said trunnions.

26. A house construction comprising a folding-bed compartment, an adjoining compartment, with an intervening wall having its upper part projecting into the bed-compartment and its lower part projecting into the adjoining compartment and an intermediate ledge, and a folding and sliding bed frame pivotally and slidably mounted in said recess so as to slide back under said ledge and fold into the bed-compartment.

27. A house construction comprising a folding-bed compartment, and adjoining closet and bed compartment, with an intervening wall-casing having a horizontal ledge, the upper end of said wall being relatively advanced into the folding-bed compartment, a folding bed pivotally and slidably mounted in said folding-bed compartment so as to slide under said ledge and fold into its compartment, and a bed hinged in the closet-compartment and adapted, when lowered, to rest on said ledge.

28. A house construction comprising a hinged bed, and a fixed ledge arranged parallel to the sides of the bed, and adapted to act as a lateral extension of the bed when down.

29. A house construction comprising a hinged bed, and a fixed ledge arranged parallel to the sides of the bed and adapted to support one side of the bed when the latter is lowered and to constitute a lateral extension of the bed.

30. A house construction comprising a bath-compartment, an adjoining apartment having a folding-bed compartment projecting into the bath-compartment, the wall between said compartments having its lower part offset into the bath-compartment to form a horizontal ledge, a folding bed arranged to slide under said ledge and fold into said folding-bed compartment and a bath-tub in the bath-compartment arranged adjacent to the said ledge.

31. In an apartment construction, a floor, a wall-casing having a recess, and a folding bed pivotally and slidaby mounted in said recess and provided with roller means engaging said floor when the bed is lowered.

32. In an apartment construction, a floor, a wall-casing having a recess, and a folding-bed frame pivotally and slidably mounted in said recess and provided with a mantelpiece acting also as a bed-support, and roller means in the edge of said mantelpiece.

33. In an apartment construction, a floor, a wall-casing having a recess, and a folding bed pivotally and slidably mounted in said recess and provided with roller means engaging said floor when the bed is lowered, a mantelpiece on said bed acting as a bed-support, and carrying said rollers and provided with moldings simulating the appearance of said roller means.

34. In an apartment construction, a wall-casing having a recess, a heater mounted in fixed position near said recess, and a folding bed pivotally mounted in said recess and a fixed fireplace coöperating with said heater and exposed when the bed is raised.

35. In an apartment construction, a wall-casing having a recess, a gas-heater mounted in fixed position near said recess, and a folding bed pivotally mounted in said recess and a fixed fireplace coöperating with said heater and exposed when the bed is raised.

36. In an apartment construction, a wall-casing having a recess, a heater fixed near said recess, trunnions on the wall-casing in said recess, one of said trunnions being hollow, a bed-frame pivotally mounted on said trunnions and a fixed fireplace, adapted to coöperate with the heater and exposed when the bed is raised, and flue means leading from said fireplace through said hollow trunnion.

37. In an apartment construction, a wall-casing having a recess, a bed-frame pivotally mounted in said recess, and a headboard movably supported in said recess, so as to advance and act as a closure for the recess when the bed is lowered.

38. In an apartment construction a wall-casing having a recess, a bed-frame pivoted therein, a headboard in said recess and a movable support for said headboard adapted and arranged to allow forward movement of the headboard when the bed is lowered.

39. In an apartment construction a wall-casing having a recess, a folding bed pivoted in said recess, a headboard movably mounted in said recess, so as to move forward to act as a closure for the recess when the bed is lowered, and adapted to be engaged by the bed when the latter is raised, to cause the headboard to be moved back in the recess.

40. In an apartment construction, a wall-casing having a recess, a folding bed pivoted in said recess, a headboard in said recess, and parallel-motion links pivoted to the casing and to the headboard and supporting the latter so as to enable its forward-and-back movement.

41. An inclosure, a wall dividing the inclosure into two apartments and furnished with a passage communicating between the apartments, a strip hinged to the wall at one side of said passage, a body connected to said strip by a horizontal pivot and forming a closure for said passage, a horizontally-slidable bolt adapted to form a releasable pivotal connection between the body and the wall at the other side of the passage in line with the aforesaid horizontal pivot, and means for holding the body in a substantially horizontal position.

42. An inclosure, a wall dividing between two apartments in said inclosure and furnished with a passage communicating between the apartments, a strip hinged to the wall at one side of said passage, a body pivoted to said strip by a horizontal pivot and forming a closure for the passage, means on the body engaging with the strip when the body is in vertical position to support the body against lateral strain, means for pivotally connecting the body to the wall at the other side of the passage and means for holding the body in substantially horizontal position.

43. An inclosure, a wall dividing between two apartments in said inclosure and furnished with a passage communicating between the apartment, a strip hinged to the wall at one side of said passage, a body pivoted to said strip by a horizontal pivot and forming a closure for the passage, means on the body engaging the strip when the body is in vertical position to support the body against lateral strain, means for pivotally connecting the body to the wall at the other side of the passage and a leg hinged to the body to support one end thereof when the body is in substantially horizontal position.

44. An inclosure, a wall dividing between two apartments in said inclosure and furnished with a passage communicating between the apartments, a strip hinged to the wall at one side of said passage, a body pivoted to said strip by a horizontal pivot and forming a closure for the passage, means for holding the door in substantially horizontal position on its said pivot, and means for locking said body to said strip when in a vertical position.

45. An inclosure, a wall dividing between two apartments in said inclosure and furnished with a passage communicating between the apartments, a strip hinged to the wall at one side of said passage, a body pivoted to said strip by a horizontal pivot and forming a closure for the passage, and a leg hinged to said body to support one end when the body is in a substantially horizontal position.

46. An apartment-suite comprising two communicating apartments, a series of compartments occupying one side of one of the apartments and constituting respectively a kitchen-compartment, a folding-bed compartment, and a bed and closet compartment, a series of compartments occupying one side of the other apartment and comprising a bath-compartment, a folding-bed compartment and a bed and closet compartment, the folding-bed compartment projecting into adjacent compartments, folding beds pivotally mounted in said folding-bed compartment, beds pivotally mounted in the bed and closet compartments, heaters arranged in folding-bed compartments, gas-stove and heating means in the kitchen and bath compartments adjoining the folding-bed compartments and gas connections common to said heating and stove devices.

47. An apartment construction comprising a wall-casing having a recess, a folding bed mounted in said recess, and ventilating connections to the lower and upper parts of said recess.

48. An apartment construction comprising a wall-casing having a recess, a folding bed mounted in said recess, ventilating connections to the lower and upper parts of said recess, and valve means for said ventilating connections.

49. In an apartment construction a wall-casing having a recess, ventilating connections to the lower and upper part of said recess, a folding bed pivoted in said recess, and rack means on said bed adapted to extend in the recess when the bed is raised to provide for support and ventilation of bedclothing.

50. In an apartment-house construction, a wall-casing, forming two apartments with sets of compartments occupying one side of each apartment, one set of compartments comprising a kitchen, folding-bed and closet and bed compartments, and the other set comprising bath, folding-bed and closet and bed compartments, a sink and adjacent inclined tray in the kitchen-compartment, a swinging shelf under said tray, a gas-stove and a swinging support therefor, constituting a door-leaf between the kitchen-compartment and the adjacent apartment, a folding bed pivotally and slidably mounted in the folding-bed compartments, a movable headboard mounted in the bed-compartment to move forward and close the same when the bed is lowered, a bed hinged to the wall-casing in one of the closet and bed compartments, the wall-casing between the folding-bed compartment and the adjoining compartment being a horizontal ledge to serve in one case as a support for said hinged bed, and in the other case as a seat adjacent to the bath-tub, a bed formed as a door for the other closet and bed compartment, and adjusted to swing vertically on a door, and horizontally to serve as a bed, partition means consisting of spring-rollers and curtains winding thereon and pivotally connected together, and the wall-casing having recess means to receive the partition means when not in use, and means for supporting the curtain means in extended position from the wall-casing.

51. An apartment-house construction, comprising a plurality of rooms or compartments having an open space above them, and draft passage-ways communicating through such open space, from side to side of the house.

52. In an apartment-house, a draft-passage means communicating from side to side of the house, and rooms or compartments opening upwardly into said draft-passage means.

53. In an apartment-house, a plurality of suites of rooms, an intervening hall, compartments with open spaces above them being provided in each suite, and draft-passage means leading over the hall and through the side walls of the house, to establish draft connection from side to side of the house over said compartments, and ventilating connections leading from said compartments to the open spaces above same.

54. In an apartment construction, a wall having an opening therethrough, a bed pivoted in the opening, and a closer for the opening, operated by the movement of the bed to close the opening when the bed is lowered.

55. In an apartment construction, a wall having an opening therein, a closer for the opening, and a bed pivoted in the opening and adapted to displace the closer when the bed is raised to close the opening.

56. A compartment having in one wall an offset receptacle, a bed pivoted therein, and a bed pivoted to another wall and adapted to move into and out of position above the offset of said receptacle.

In testimony whereof I have signed my name to this specification, in the presence of two subscribing witnesses, at Los Angeles, in the county of Los Angeles and State of California, this 6th day of March, 1903.

WILLARD C. JAMES.

Witnesses:
ARTHUR P. KNIGHT,
JULIA TOWNSEND.